Dec. 9, 1958  E. LISOTA  2,863,673
TRAILER HITCH

Filed May 21, 1956  2 Sheets-Sheet 1

INVENTOR.
Edward Lisota
BY Webster & Webster
ATTYS.

Dec. 9, 1958  E. LISOTA  2,863,673
TRAILER HITCH

Filed May 21, 1956  2 Sheets-Sheet 2

INVENTOR.
Edward Lisota
BY Webster & Webster
ATTYS.

United States Patent Office 2,863,673
Patented Dec. 9, 1958

2,863,673

TRAILER HITCH

Edward Lisota, Patterson, Calif., assignor, by mesne assignments to Harsha, Henderson and Johnson, Incorporated, Modesto, Calif., a corporation of California Application May 21, 1956, Serial No. 586,146

4 Claims. (Cl. 280—406)

This invention is directed to, and it is a major object to provide, a novel hitch adapted for connection between a draft or towing vehicle, such as an automobile or pickup truck, and a trailer; the hitch being especially designed—but not limited—for use with heavy house trailers or the like which impart a substantial downthrust or load through the forwardly projecting trailer tongue. Such load—from the trailer tongue, and unless compensated for—tends to cause the hitch to articulate downwardly, resulting in undue and undesirable sagging or lowering of the towing vehicle at the rear and the trailer at the front.

It is therefore another important object of this invention to provide a trailer hitch which so compensates for the load from the trailer tongue and effectively maintains the towing vehicle and the trailer at a proper level, especially at the rear of said vehicle and the front of the trailer.

An additional object of the invention is to provide a trailer hitch which can be readily and easily manually disconnected; the hitch including springs which are quick-detachable from sockets in which said springs normally engage.

A further object of the invention is to provide a trailer hitch in which the portion of said hitch which is carried by the towing vehicle and projects rearwardly of the bumper thereof, can be conveniently removed when the hitch is not in use, and at which time such projection is undesirable; such portion of the hitch being detachable from its mounting frame, the latter being rigidly secured to the vehicle and occupying a position below, and mainly ahead of, said bumper.

It is also an object of the invention to provide a trailer hitch which is designed for ease and economy of manufacture.

Still another object of the invention is to provide a practical, reliable, and durable trailer hitch, and one which will be exceedingly effective for the purpose for which it is designed.

These objects are accomplished by means of such structure and relative arrangement of parts as will fully appear by a perusal of the following specification and claims.

Figure 1:
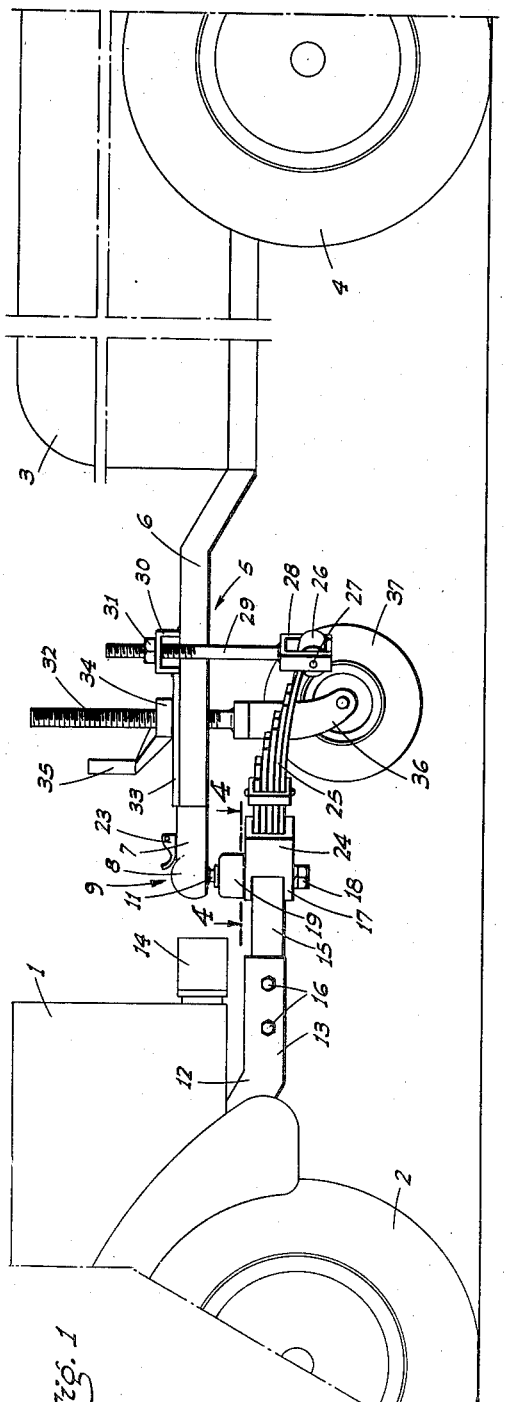
Fig. 1 is a side elevation of the trailer hitch coupling a towing vehicle, and a trailer, i. e., the hitch being shown as in use.

Referring now more particularly to the drawings and to the characters of reference marked thereon, the hitch is adapted for use between a towing vehicle, indicated at 1, having rear wheels 2, and a trailer, indicated at 3, having wheels 4.

A rigid tongue 5 is secured to, and projects forwardly from, the front end of the trailer 3; such tongue tapering forwardly and including side beams 6.

At its converging front end the trailer tongue 5 incorporates, in rigid relation, a central, forwardly extending shank 7 formed with the downwardly opening socket 8 of a ball and socket coupling unit, indicated generally at 9; the ball of said unit, and which normally engages in the socket 8, being shown at 10.

Such ball 10 is rigidly supported, in an upstanding position, by means of an integral, downwardly extending neck 11 thereon, which neck is mounted as will hereinafter appear.

The portion of the hitch which is carried by the towing vehicle 1 comprises a mounting frame 12, of suitable type, rigidly attached to the frame (not shown) of the vehicle 1; said mounting frame 12 including a central, rearwardly projecting, longitudinal channel section 13 disposed in a plane which extends below the bumper 14 of said vehicle. The channel section 13 terminates, at its rear end, short of the back face of said bumper 14; said channel section being open downwardly and to the rear.

A relatively short, longitudinal draft bar 15 seats at its forward end in the channel section 13 in matching relation, and is removably secured therein by cross bolts 16. The draft bar 15, while relatively short, is of sufficient length to project to an outer end termination rearwardly of the vertical transverse plane of the bumper 14.

At its outer or rear end the draft bar 15 projects into a transverse, forwardly opening channel block 17 centrally of the ends of the latter, and said bar 15 is pivoted in the channel block 17 by a cap screw 18 for relative swinging motion about said cap screw as an axis.

On top thereof, and in a central position, the channel block 17 is fitted with a welded-in-place pedestal 19 of inverted cup-like form; such pedestal being formed in the top with a bore 20 and at the back with a nut entry opening 21.

The ball 10 of the ball and socket coupling unit 9 is disposed immediately above the pedestal 19 with the ball neck 11 extending downwardly through the bore 20; a nut 22—initially passed through the opening 21—being threaded on the inner end of the neck 11, whereby to fixedly secure the ball 10 in position.

Figure 2:
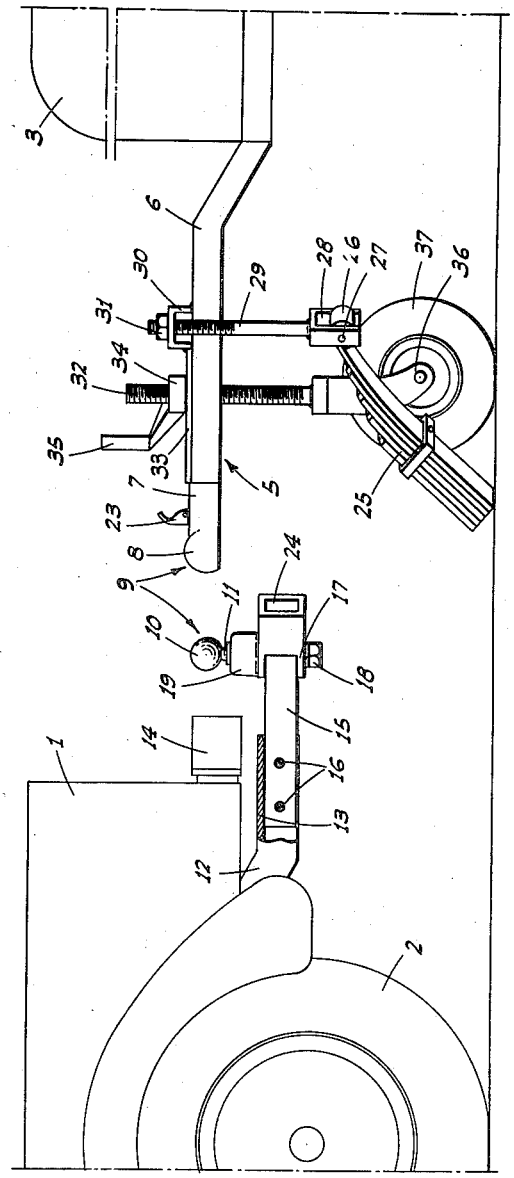
Fig. 2 is a similar view, but shows the hitch uncoupled.
Figure 3:
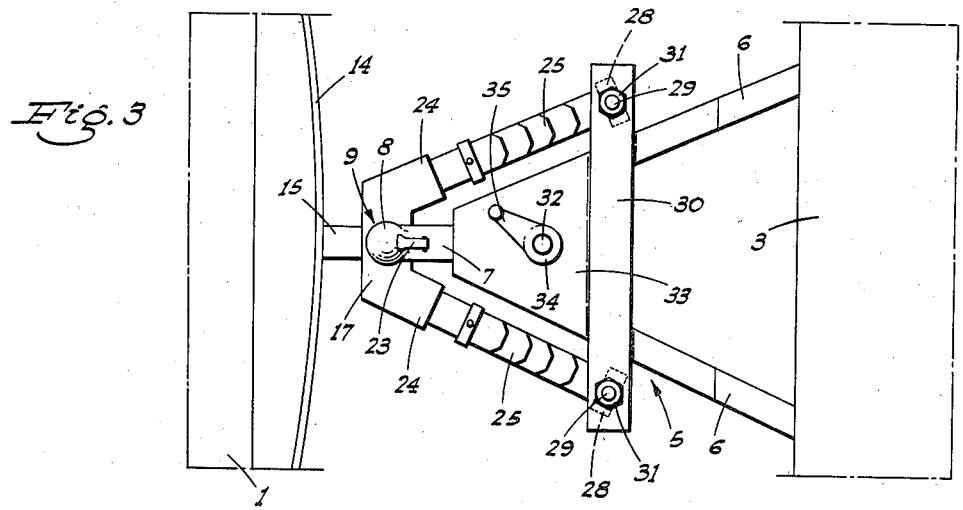
Fig. 3 is a plan view of the hitch.
Figure 4:
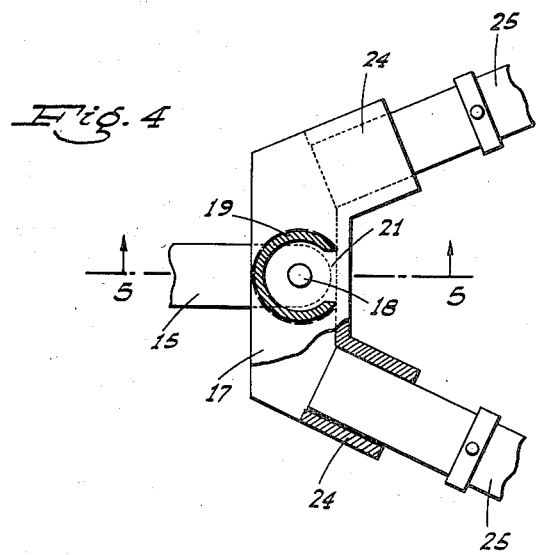
Fig. 4 is a fragmentary enlarged sectional plan on line 4—4 of Fig. 1.
Figure 5:
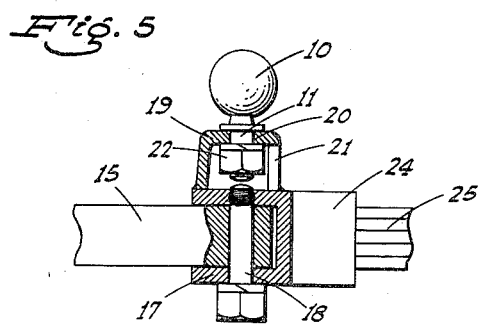
Fig. 5 is a fragmentary longitudinal sectional elevation taken on line 5—5 of Fig. 4.

When the hitch is coupled, the socket 9 carried on the forward end of the tongue 5 embraces the ball 10, being held against escape by suitable latch mechanism (not shown) which includes a latch release lever 23 shown in its holding position in Fig. 1, and shown in its released position in Fig 2.

While the ball and socket coupling unit 9 comprises the actual and universal connection between the portion of the hitch on the towing vehicle 1, and the portion of the hitch on the trailer 3, the following spring assembly is employed for the purpose of compensating for the tendency of the hitch to buckle or articulate downwardly, with resultant lowering or sagging of the vehicle 1 and trailer 3 at adjacent ends:

The transversely extending channel block 17 is formed, at the ends and in integral relation, with rearwardly opening but laterally outwardly divergent sockets 24, wherein the socket openings are rectangular in cross section.

A quarter-elliptical, multi-leaf spring 25 is removably engaged at its heavy-duty end in each of the sockets 24; said springs 25 extending rearwardly some distance from said sockets and in diverging relation. As so mounted, the springs 25 extend rearwardly substantially parallel to the forwardly converging side beams 6 of the tongue 5 but lie in positions laterally outwardly of and in a plane beneath said beams.

The springs 25, at their rear ends 26, are transversely pivoted, as at 27, in forks 28 on the lower end of suspension rods 29 which are threaded at their upper ends. The upper ends of the suspension rods 29 extend through the outer ends of a cross bar 30 fixed on the tongue 5; such outer ends of the cross bar 30 being disposed laterally outwardly of the related side beams 6.

Above the outer ends of the cross bar 30 nuts 31 are threaded on said suspension rods 29, whereby the latter are vertically adjustable.

For the purpose of supporting the tongue 5 above ground when such tongue is uncoupled, it is provided with a conventional caster wheel arrangement which comprises a threaded spindle 32 which extends through a horizontal plate 33 on the forward end portion of said tongue; a nut 34 journaled on the plate 33 being adapted to be actuated by an included hand crank 35.

At its lower end and below the plate 33, the spindle 32 carries a caster-mounted fork 36 in which a wheel 37 is journaled. The spindle 32 is normally adjusted upwardly to maintain the wheel 37 in a ground clearance position when the hitch is in use.

In use of the described hitch the ball and socket coupling unit 9 is engaged; the springs 25 are seated at their forward ends in the sockets 24; and the nuts 31 are run down on the suspension rods 29 sufficient to tension such springs to an extent that they effectively compensate for the tendency of the hitch to buckle or articulate in a downward direction. Hence, the hitch is effective to prevent undesirable sagging or lowering of the rear end of the towing vehicle and forward end of the trailer 3 when said hitch is coupled for towing said trailer.

When it is desired to uncouple the hitch, the spindle 32 is run downwardly a distance sufficient to engage the wheel 37 with the ground and to impart a lifting force on the tongue 5, whereupon the ball and socket coupling unit 9 is released and the socket 8 is removed off of the ball 10.

Nextly, the nuts 31 are run relatively upwardly on the suspension rods 29, relieving the tension of the springs 25, so that with relative separation of the towing vehicle 1 and trailer 3, said springs slide horizontally out of the sockets 24, which completes the uncoupling of the hitch (see Fig. 2). The towing vehicle is then free for use independently of the trailer 3.

Under certain circumstances—when the towing vehicle 1 is being independently used—it is undesirable to have the assembly of the draft bar 15, channel block 17, and ball 10 projecting rearwardly of the vehicle bumper 14. To detach such assembly it is only necessary to remove the cross bolts 16, which permits the draft bar 15 to be detached from the channel section 13.

It is to be recognized that while the hitch in its present embodiment is described as including a pair of the springs 25, for certain types of relatively light load use only a single spring need be included, with such spring extending more or less centrally beneath the tongue 5, with corresponding orientation of the related socket and suspension rod.

From the foregoing description it will be readily seen that there has been produced such a device as will substantially fulfill the objects of the invention, as set forth herein.

While this specification sets forth in detail the present and preferred construction of the device, still in practice such deviations from such detail may be resorted to as do not form a departure from the spirit of the invention, as defined by the appended claims.

Having thus described the invention, the following is claimed as new and useful, and upon which Letters Patent are desired:

1. In a trailer hitch which includes one draft portion on a towing vehicle at the rear, another draft portion on a trailer at the front, and a universal disengageable coupling detachably connecting adjacent ends of said portions; a member pivoted in connection with said one portion for swinging about an axis vertically alined with said universal coupling, the member being formed with a rearwardly opening socket, a leaf spring slidably and removably fitted at its forward end in the socket and immovable relative thereto when the coupling is engaged and extending rearwardly therefrom, and a suspension element between the rear end of the spring and said other portion.

2. In a trailer hitch which includes one draft portion on a towing vehicle at the rear, another draft portion on a trailer at the front, and a universal disengageable coupling between adjacent ends of said portions; a member pivoted in connection with said one portion for swinging about an axis vertically alined with said universal coupling, the member being formed with a pair of transversely spaced rearwardly opening sockets, corresponding leaf springs slidably and removably fitted at one end in the sockets when the coupling is engaged and extending rearwardly therefrom, and suspension elements between the rear ends of the springs and said other portion.

3. In a trailer hitch which includes a draft bar mounted on a towing vehicle at its rear end, a draft tongue on a trailer at its forward end, a disengageable universal coupling between adjacent ends of the bar and tongue, a rigid member pivoted on the draft bar for swinging about an axis vertically alined with the coupling, a longitudinally extending quarter-elliptic leaf spring, and means including a suspension rod transversely pivoted on the rear end of the spring supporting the spring from the draft tongue; said member having a rearwardly opening substantially horizontal socket in which the heavy forward end of the spring is slidably and removably fitted when the coupling is engaged, said spring end being removable from the socket upon longitudinal separating movement of the vehicle and trailer.

4. In a trailer hitch which includes a draft bar mounted on a towing vehicle at its rear end, a draft tongue on a trailer at its forward end, a disengageable universal coupling between adjacent ends of the bar and tongue, a transverse rigid member pivoted on the draft bar for swinging about a central vertical axis alined with the coupling, said member being formed with a pair of transversely spaced rearwardly opening sockets disposed in rearwardly diverging relation to each other, a pair of forwardly converging quarter-elliptic leaf springs slidably and removably fitted at their heavy forward end in the sockets and when the coupling is engaged, a cross bar mounted on the tongue, and upstanding suspension rods pivotally connected to the rear end of the springs, and turnably mounted in the cross bar.

References Cited in the file of this patent

UNITED STATES PATENTS

| | | |
|---|---|---|
| 1,695,259 | Templin | Dec. 11, 1928 |
| 2,385,253 | Black | Sept. 18, 1945 |
| 2,453,941 | Smit | Nov. 16, 1948 |
| 2,643,891 | Mosley | June 30, 1953 |
| 2,653,822 | Martin | Sept. 29, 1953 |
| 2,688,496 | Shooltz et al. | Sept. 7, 1954 |
| 2,711,908 | Saxon | June 28, 1955 |
| 2,715,034 | Cornwall | Aug. 9, 1955 |